Dec. 28, 1965 J. E. LEWIS 3,225,825
COLD TRAP
Filed July 13, 1962 2 Sheets-Sheet 1
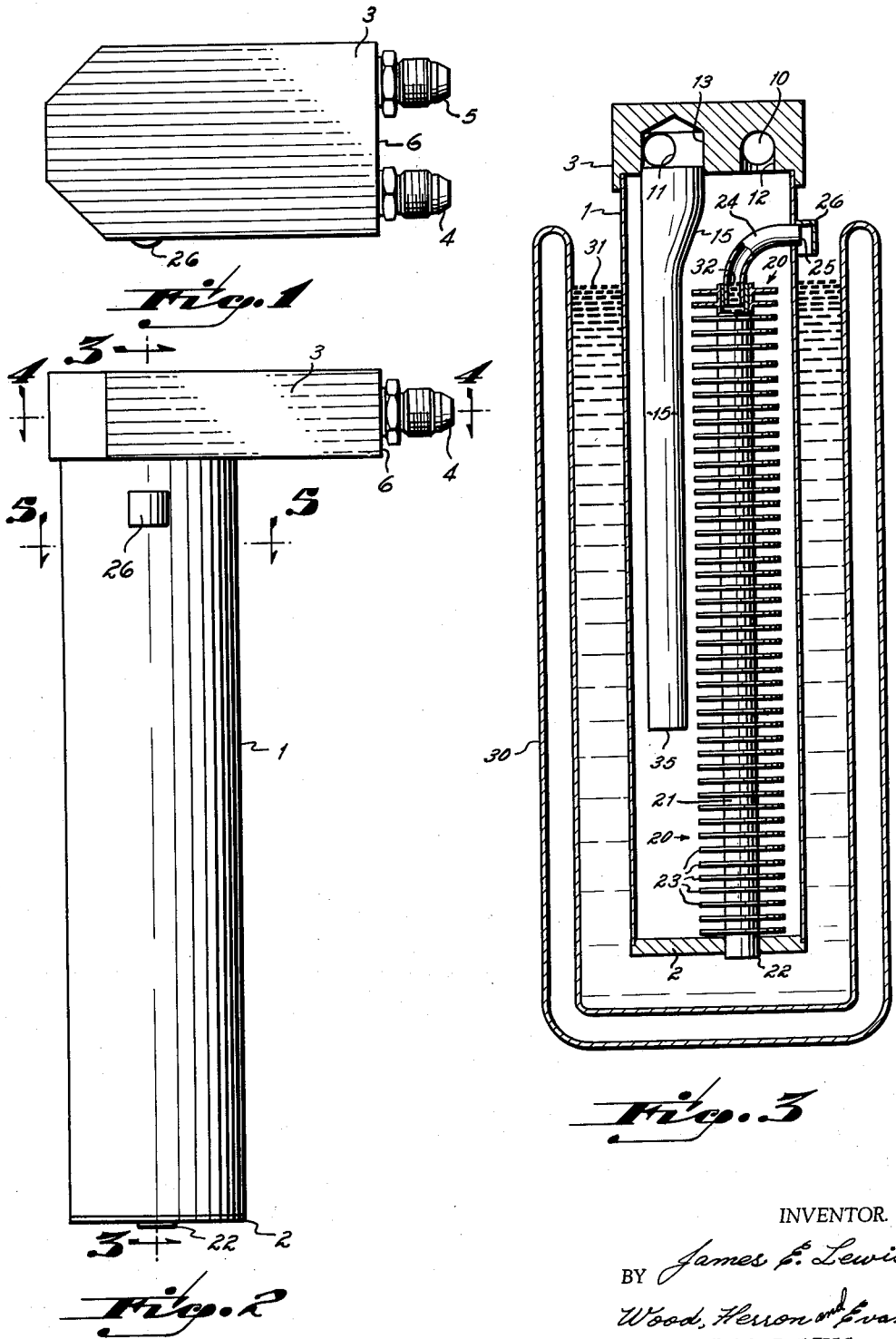
INVENTOR.
BY James E. Lewis
Wood, Herron and Evans
ATTORNEYS Dec. 28, 1965 J. E. LEWIS 3,225,825
COLD TRAP Filed July 13, 1962 2 Sheets-Sheet 2

INVENTOR.

BY James E. Lewis

Wood, Herron & Evans
ATTORNEYS 3,225,825
COLD TRAP
James E. Lewis, Louisville, Ky., assignor, by mesne assignments, to The Martin Sweets Company, Inc., Louisville, Ky., a corporation of Kentucky
Filed July 13, 1962, Ser. No. 209,629
7 Claims. (Cl. 165—157)

This invention relates to apparatus for resolving or separating a gaseous mixture by freezing one or more of the components of the mixture which has a freezing point different than the freezing points of the other components of the gaseous mixture. Such apparatus is commonly called a low temperature trap or a cold trap.

In use, cold traps are cooled to very low temperatures by cryogens such as liquid oxygen, liquid nitrogen, Dry Ice, or the like. Typically, a mixture of gases having substantially different freezing points is introduced into the cold trap and chilled to a temperature below the freezing or boiling point of one or more of its components but at which the remaining components remain gaseous; at such temperature the higher freezing point components solidify or liquify and are thereby separated from the other gases, which pass through the trap. As an example, a cold trap may be used to quantitatively separate carbon dioxide, which freezes at $-79.5°$ C., from admixed oxygen, which liquifies at $-183°$ C., by cooling the trap in liquid nitrogen to a temperature below the freezing point of carbon dioxide. Carbon dioxide freezes out of the mixture as it passes through the trap at the low temperature maintained by the nitrogen, while the oxygen substantially passes through the trap. Some $O_2$ may tend to liquify in the trap because of the extremely low temperature of liquid $N_2$; solidified or liquified low freezing point components are subsequently allowed to revaporize or are removed by pumping because they exhibit a significant vapor pressure while the higher freezing point components remain solid and exhibit insignificant vapor pressure, so that a sharp separation is effected.

In the past, the above noted tendency under certain conditions of low freezing point components of the mixture being separated to partly solidify or liquify with the higher freezing components, has made necessary the use of extended revaporization periods, often of several hours duration, to permit the lower freezing components to return to the gaseous phase and thereby complete the separation.

This invention is directed to an improved construction for cold traps, whereby separation of gases is achieved more efficiently and quickly and whereby sharp quantitative separations may be made more rapidly without the necessity of long distilling off periods which prior trap constructions have often required.

Briefly put, the cold trap I have invented comprises a hollow cylinder or container, preferably of stainless steel, closed at both ends, which has a hollow, finned tube preferably of copper extending through it from end to end. This hollow tube has a plurality of outwardly extending spaced fins or plates. Baffle or flow directing means cause gas introduced through an inlet into the trap to flow over substantially the entire length of the finned tube, to an outlet.

The cold trap of this invention is particularly useful for separating carbon dioxide from admixed oxygen. As previously explained, if the trap is cooled by liquid nitrogen to make this separation, some of the $O_2$ tends to freeze out with the $CO_2$, and ordinarily it is necessary to let this oxygen revaporize over a long period of time to attain sharp separation. The trap is also of special utility in other separations wherein such revaporization is required.

I have found that by incorporating a hollow, finned member of high thermal conductivity and which extends from end to end through a trap body of relatively poor thermal conductivity, partly solidified or liquified low freezing point gases are much more rapidly revaporized or distilled from higher freezing point components, while the higher freezing components are quantitatively retained in the solid state.

The invention can best be further described in relation to the accompanying drawings, in which:

FIG. 1 is a top plan view of a cold trap incorporating the features of the invention, as adapted for panel mounting.

FIG. 2 is a vertical view of the cold trap shown in FIG. 1.

FIG. 3 is a diagrammatic vertical cross section taken on line 3—3 of FIG. 2, showing the cold trap immersed in a Dewar flask.

Figure 4:
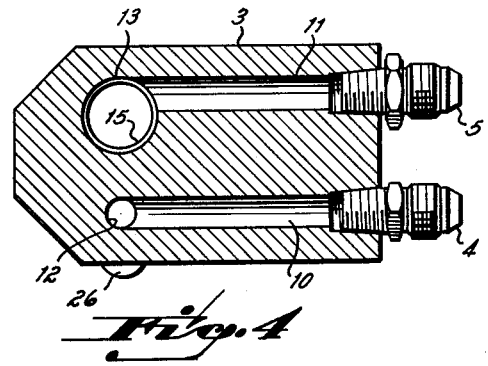
FIG. 4 is a horizontal section taken on line 4—4 of FIG. 2.
Figure 5:
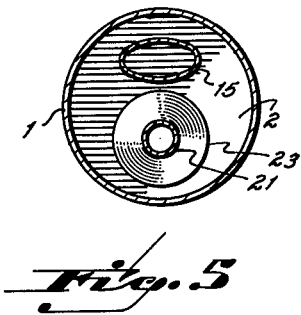
FIG. 5 is a horizontal section taken on line 5—5 of FIG. 2.

The cold trap shown in FIGS. 1–5 includes a hollow cylindrical body designated generally by 1, having a lower end closure or plug 2 and an upper end closure or cap piece 3. Preferably the body 1 and the end closures 2 and 3 are made of a metal or material having a low coefficient of thermal conductivity $k$ such as stainless steel.

In the particular arrangement shown, the cap piece 3 is adapted for mounting connection to a vertical panel not shown. This cap piece 3 has a pair of couplings or connectors 4 and 5 at its rear edge 6 which communicate with horizontal bores 10 and 11 respectively in the cap. These bores 10 and 11 are parallel and extend forwardly from the rear edge 6 of the cap piece 3. The bore 10 intersects a downwardly extending bore 12, and the bore 11 intersects a downwardly extending bore 13 of larger diameter. The couplings 4 and 5 are securable to connections of a gas transfer system. It will be appreciated that other types of mounts and/or connections may be used in place of the particular cap piece 3 shown for purposes of illustration.

A hollow flow conducting tube 15 is fitted into the larger diameter bore 13 in cap piece 3 and extends downwardly toward the lower end closure 2 of the body 1, as shown in FIG. 3. The tube 15 is partly crimped or collapsed to a semi-elliptical shape (see FIG. 5) over the greater part of its length, to provide space for the adjacent finned tube, as will be apparent from FIGS. 3 and 5. This particular tube arrangement is used to maintain a large tubular volume and still permit the crimped tube 15 to fit beside the finned tube.

Beside the tube 15 a finned hollow tubular member 20 is fixed. This finned tube 20 comprises a substantially tubular center portion 21, the lower end of which opens through the bottom closure 2 as indicated at 22, and has a large plurality of flat, circular, axially spaced fins or plates 23. It is preferably made of a material having a high thermal conductivity or $k$ factor, for example copper or aluminum. The upper end of the center tube 21 is conected to a hollow tubular elbow piece 24 which opens through the side of the body 1 at 25. A return or cover 26 is fitted over the opening where the elbow 24 extends through the body 1, to deflect downwardly any liquid droplets splashing up through the center of the finned tube 20.

In use the cold trap is immersed in a cryogenic medium. This is illustrated in FIG. 3, wherein the trap is immersed in a Dewar flask 30 in which liquid nitrogen 31 is contained. Since the finned tube 20 is hollow and presents an internal opening extending through the cold trap from bottom closure 2 to elbow outlet 25, the liquid nitrogen extends into tube 21, to an upper level indicated at 32. By controlling the level of the liquid coolant in the Dewar 30, the temperature gradient from the level of the cryogen to the top of the finned tube 20 can be controlled as desired.

The gaseous mixture which is to be separated is introduced into the cold trap at a low rate of flow through connector 4, and the gas flows through bores 10 and 12 into the body 1 above the upper end of the finned member 20. By reason of the cooling medium inside the hollow tube 21, the finned member 20 is cooled over most of its length, and as the gas mixture flows downwardly over the fins or plates 23, the gas components having higher freezing points are condensed on the plates. The mixture flows downwardly over the plates, to the lower end 35 of tube 15 through which they flow upwardly to bores 13 and 11 and to outlet coupling 5.

As previously explained, where the trap is cooled with $N_2$, some $O_2$ may condense in the trap. With the trap of this invention, condensed oxygen will revaporize rapidly and will be fractionally distilled from the carbon dioxide, by reason of the geometry and high heat conductivity of the finned tube. A sharp temperature gradient is defined between the lower end 22 and the upper end 25 of tube 20, and the upper end may be near ambient temperature. Under these conditions, condensed oxygen will vaporize rapidly, and a sharp separation of $CO_2$ or other gases is achieved. Any cryogen in tube 21 that splashes due to boiling will be returned to the flask through elbow outlet 25 and deflector 26.

Figure 6:
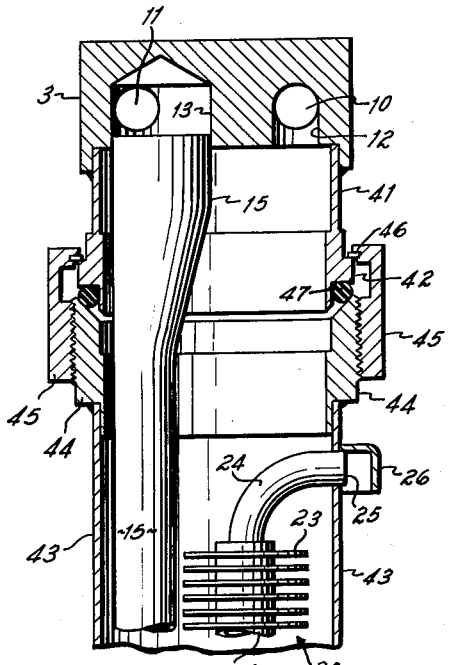
FIG. 6 is a vertical cross section of the upper portion of a cold trap in accordance with a modified embodiment of the invention, whereby the cold trap may more readily be disassembled.

In FIG. 6 is illustrated a modified embodiment of the invention whereby the body of the cold trap may be demounted from the upper end closure or cap piece to make cleaning more convenient. In the modified construction, a short hollow cylindrical member 41 is secured to the cap or upper end closure 3, and this cylindrical portion 41 has an external shoulder 42 adjacent its lower end. The tube 15 is connected to the cap 3, as in the embodiments of FIGS. 1-5. A lower cylindrical main body portion 43 contains the finned member 20 which extends upwardly from the lower end closure of the body member 43, not shown, to an elbow 24 which projects through its side at 25. Above the projection of elbow 24 through the side at 25, the body portion 43 is fitted to an externally threaded sleeve 44. An internally threaded collar 45 is held to the upper cylindrical body portion 41 by a clip 46, and engages the threads on the sleeve 44. An O-ring or other sealing means 47 is compressed between the body portions 41 and 44 as the sleeve 45 is tightened upon collar 44, so that the two body portions are held tightly together in sealing engagement. It will be appreciated that the operation of this embodiment of the invention is virtually identical to that previously described, with the exception that the body may be disassembled by unscrewing collar 45 from sleeve 44. Also, this trap may readily be filled with a gas adsorbing medium, for example, activated charcoal, to aid in certain separations.

Figure 7:
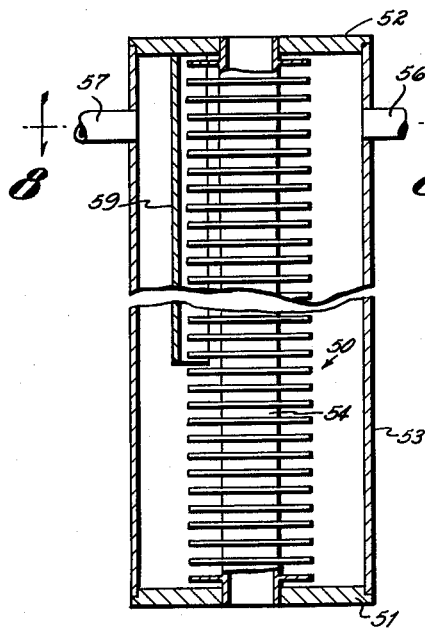
FIG. 7 is a vertical cross section, partly broken away, of a simplified cold trap including the features of the invention.
Figure 8:
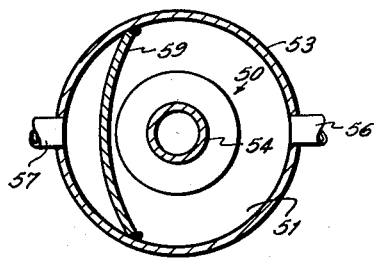
FIG. 8 is a horizontal cross section taken on line 8—8 of FIG. 7.

A simplified embodiment of the invention is illustrated in FIGS. 7 and 8. In this construction, a finned central tube 50 extends axially between the end closures 51 and 52 of a cylindrical body 53, the tubular central portion 54 of the finned member 50 opening exteriorally at each end of the cold trap. A tube 56 enters through the body 53 on one side and tube 57 extends through the body 53 on the opposite side. A curved baffle or deflector 59 is secured to the top closure 52 and sides of the body 53, and extend downwardly approximately over 60 to 70% of the length of the finned tube 50.

In the operation of that embodiment of the invention which is illustrated in FIGS. 7 and 8, the gas mixture is introduced either through tube 56 or 57, and flows downwardly around the lower end of the baffle plate 59 to the opposite tube 57 or 56, thereby flowing over the plates of the finned tube 50, so that the higher melting components of the mixture are condensed in the manner previously described.

It should also be noted that this trap may be used as a cryogenic pump. In this application, the trap is filled with an adsorbing medium such as a molecular sieve material or activated charcoal, and is put in the position of, and in place of, the usual fore-pump of a vacuum system. When cooled with liquid nitrogen or liquid helium, the gases in the system are adsorbed sufficiently that a diffusion or ionic pump becomes effective. A closed system may be evacuated in this manner to a residual pressure of a few microns.

The trap may also be used as a clean up trap in a vacuum system to prevent the migration of oil or mercury vapors past it into the system.

Having described my invention, what is claimed is:

1. A cryogenic-fluid immersible cold trap for separating gases with differing freezing temperatures from a mixture of such gases, said cold trap comprising: a hollow member for immersion in a body of cryogenic fluid held in a suitable container, said hollow member comprising bottom, side and top wall means defining a closed chamber; an inlet extending through said wall means at the bottom of said chamber through which such cryogenic fluid may be admitted; an outlet extending through said wall means at a point spaced from and above said inlet through which such cryogenic fluid may be discharged; conduit means within said chamber and interconnecting said cryogenic fluid inlet and outlet, said conduit means having a coefficient of thermal conductivity substantially greater than that of the wall means of said chamber and defining a passage extending through said chamber but not in communication with the interior thereof and through which such cryogenic fluid may pass; fin means on the exterior of said conduit means in said chamber; inlet and outlet ports for said gaseous mixture extending through said wall means at the top of said chamber; and directing means in said chamber between said gaseous mixture inlet and outlet ports for causing gaseous mixture introduced through said gaseous mixture inlet to flow over said fin means to reach said gaseous mixture outlet, whereby when said cold trap is immersed in a body of cryogenic fluid and said fluid enters said cryogenic fluid passage through the bottom of said immersible member, said fluid will absorb heat through the walls of said conduit means from gaseous mixture flowing over said fin means within said chamber and may then boil off through said cryogenic fluid outlet.

2. Apparatus in accordance with claim 1 wherein said directing means is a tubular member secured to said top wall means around said inlet and extending downwardly in said chamber adjacent said conduit means.

3. Apparatus in accordance with claim 1 wherein said directing means is a baffle secured to said top wall means between said gaseous mixture inlet and outlet and extending downwardly in said chamber.

4. Apparatus in accordance with claim 1 having aluminum conduit means.

5. Apparatus in accordance with claim 1 having copper conduit means.

6. Apparatus in accordance with claim 1 having a hollow immersible member of stainless steel.

7. Apparatus in accordance with claim 1 wherein said cryogenic fluid outlet extends through said side wall means and a deflector is secured to the exterior of said side wall means adjacent said outlet for downwardly deflecting cryogenic fluid which boils off through said outlet.

References Cited by the Examiner

UNITED STATES PATENTS

| | | | |
|---|---|---|---|
| 1,794,336 | 2/1931 | Jacocks | 165—158 |
| 1,935,412 | 11/1933 | Price | 165—160 |
| 2,268,979 | 1/1942 | Williamson et al. | 165—160 |
| 3,081,068 | 3/1963 | Milleron | 55—269 X |
| 3,137,551 | 6/1964 | Mark | 165—111 X |

ROBERT A. O'LEARY, *Primary Examiner.*

FREDERICK L. MATTESON, JR., CHARLES SUKALO, *Examiners.*